United States Patent
Kang

(10) Patent No.: US 7,602,166 B1
(45) Date of Patent: Oct. 13, 2009

(54) SYSTEM AND METHOD FOR PROVIDING A DIGITAL SELF-ADJUSTING POWER SUPPLY THAT PROVIDES A SUBSTANTIALLY CONSTANT MINIMUM SUPPLY VOLTAGE WITH REGARD TO VARIATIONS OF PVT, LOAD, AND FREQUENCY

(75) Inventor: Dae Woon Kang, Lafayette, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 178 days.

(21) Appl. No.: 11/248,893

(22) Filed: Oct. 12, 2005

(51) Int. Cl.
*G05F 1/575* (2006.01)
(52) U.S. Cl. .................. 323/283; 713/322; 327/262
(58) Field of Classification Search .............. 323/283, 323/907; 713/322; 327/262
See application file for complete search history.

(56) References Cited

U.S. PATENT DOCUMENTS

| | | | | |
|---|---|---|---|---|
| 5,539,357 A | * | 7/1996 | Rumreich | 331/17 |
| 6,548,991 B1 | * | 4/2003 | Maksimovic et al. | 323/224 |
| 6,870,410 B1 | * | 3/2005 | Doyle et al. | 327/149 |
| 7,069,461 B1 | * | 6/2006 | Chan et al. | 713/501 |
| 7,206,959 B1 | * | 4/2007 | Chan et al. | 713/501 |
| 2003/0093160 A1 | * | 5/2003 | Maksimovic et al. | 700/14 |

\* cited by examiner

*Primary Examiner*—Adolf Berhane
*Assistant Examiner*—Harry Behm

(57) ABSTRACT

A system and method is disclosed that provides a digital self-adjusting power supply for semiconductor digital circuits. The power supply provides a substantially constant minimum supply voltage with regard to process corner, junction temperature, external voltage source, load variation, and operating frequency. The system comprises a slack time detector, a voltage adjuster, and a digital pulse width modulation (PWM) modulator. The system supplies a minimum required voltage without the used of a band gap or reference voltage. A finite state machine is also used to minimize oscillations introduced by start-up, load transients, frequency changes, and the like, thereby eliminating the need for a proportional integrator differentiator (PID) circuit.

18 Claims, 12 Drawing Sheets

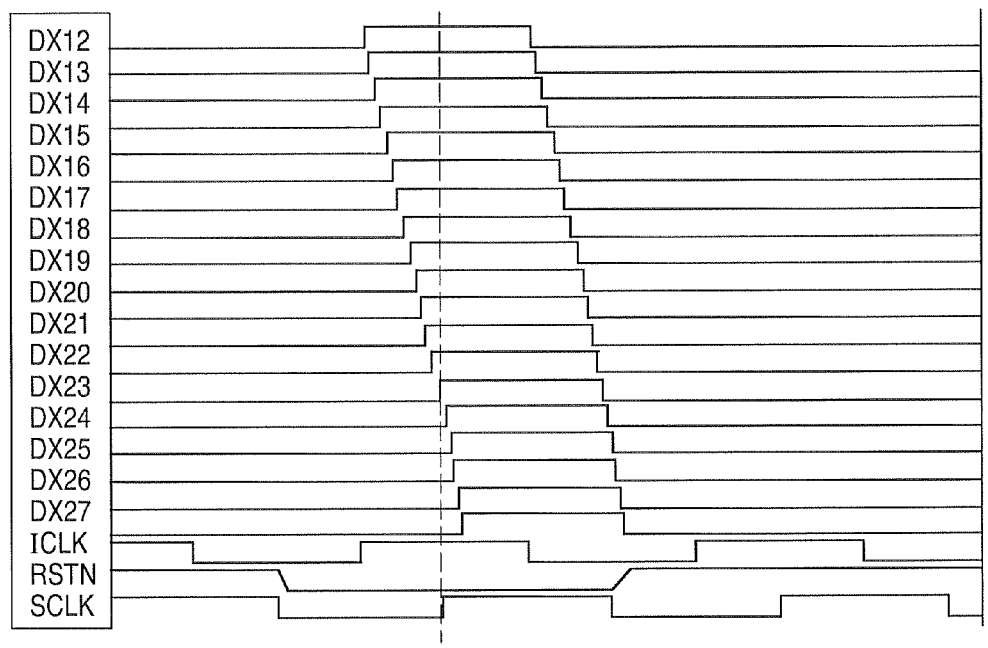
FIG. 5
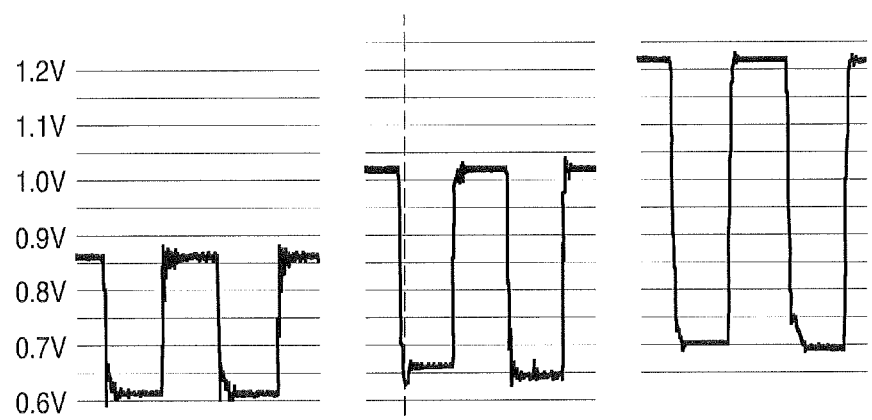
FIG. 10A  FIG. 10B  FIG. 10C

SYSTEM AND METHOD FOR PROVIDING A DIGITAL SELF-ADJUSTING POWER SUPPLY THAT PROVIDES A SUBSTANTIALLY CONSTANT MINIMUM SUPPLY VOLTAGE WITH REGARD TO VARIATIONS OF PVT, LOAD, AND FREQUENCY

TECHNICAL FIELD OF THE INVENTION

The present invention is generally directed to manufacturing technology for semiconductor devices and, in particular, to digital self-adjusting power supply systems that provide a substantially constant minimum power supply voltage.

BACKGROUND OF THE INVENTION

Semiconductor process technology continues to reach lower voltages and deeper sub-micron sizes. As the number of transistors per integrated circuit chip has continued to increase, two critical circuit design issues have been presented. The first design issue is the non-uniformity of process parameters within a single die. The second design issue is the increment in power consumption per die.

In deep sub-micron circuit design, variations due to the non-uniformity of process parameters within a single die cause differences in transistor and interconnect characteristics across the single die. These differences in turn negatively impact the performance of the circuit because they generate deviations in MOSFET (Metal Oxide Semiconductor Field Effect Transistor) drive current. This results in propagation delay distributions of the critical path across a chip.

Furthermore, the distribution of process parameters expands from die to die within a single wafer as well as within a lot. After fabrication, operating variations such as power supply voltage, chip temperature, and across-chip temperature also affect the magnitude of the propagation delay. By combining both operational and process induced variations, the magnitude of the propagation delay fluctuates from eighteen percent (18%) to thirty two percent (32%).

The yield of CMOS (Complimentary Metal Oxide Semiconductor) logic circuits that satisfy a specific performance requirement is significantly influenced by the magnitude of critical path delay deviations due to both operational and intrinsic parameter fluctuations. There are two approaches to compensating for the impact of these parameter fluctuations and achieving a desired yield. The first approach is to reduce the performance by operating at a lower clock frequency. The second approach is to increase the supply voltage.

In many portable computing devices such as MP-3 players and digital cameras, the full processing power of a processor is not required all the time. There are certain times when an operating frequency can be reduced. A lower frequency corresponds to a longer allowable delay. This longer time margin also allows a supply voltage level to be lowered whereas the applied lower voltage increases the propagation delay.

Because power consumption is quadratic with the supply voltage and proportional to operating frequency, reducing both operating frequency and supply voltage allows an excellent energy efficient operation. This technique is referred to as adaptive voltage scaling (AVS). Adaptive voltage scaling decreases power consumption without sacrificing performance provided that the tasks that are performed are finished within an allowed time. From the trade-off between performance and energy consumption, supplying just enough voltage to a system at a given frequency represents its optimum power consumption.

Although the operating frequency limits allowable propagation delay, this delay strongly depends on intrinsic process parameters, supply voltage and junction temperature (referred to by the abbreviation "PVT"). The propagation delay in a MOSFET is proportional to the product of the active resistance of the MOSFET (designated $R_{ON}$) and the load capacitance (designated $C_L$). The resistance $R_{ON}$ is given by:

$$R_{ON} = \frac{V_{DD}}{\beta(V_{DD} - V_T)^\alpha} \quad (1)$$

where $\alpha$ is the velocity saturation term, $\beta$ is the process transconductance parameter, $V_{DD}$ is the supply voltage, and $V_T$ is the threshold voltage. The load capacitance $C_L$ is given by:

$$C_L = C_D + C_G + C_W \quad (2)$$

where $C_D$ is the drain capacitance, $C_G$ is the gate capacitance, and $C_W$ is the interconnect capacitance.

Process parameters and operating junction temperature are not controllable but the supply voltage is controllable. Therefore, if the supply voltage can be adjusted to guarantee the same propagation delay regardless of the other operating conditions, then various simulations are not needed to assure proper functionality. Instead, only one simulation (i.e., the worst case simulation with a small margin) is needed to guarantee proper operation after fabricating the design.

If a design is fabricated as the best process corner, and is operating at low temperature, it needs to be less than three fourths of the minimum supply voltage required to operate at the worst case simulation. This results in power savings by reducing the power supply voltage with regard to process and temperature.

On the other hand, by dynamically adjusting the supply voltage, an individual die is adjusted to a desirable performance. Typically the supply voltage should be raised for dies that are operating slowly and lowered for dies that are operating quickly. In this manner the yield is dramatically improved by the adaptive voltage scaling (AVS) system.

Typical prior art digital control loop circuits employ direct current (DC) to direct current (DC) switching converter circuits. A DC-to-DC switching converter circuit is a device that converts a first DC voltage to a second DC voltage with very little power loss. A boost converter is one type of DC-to-DC switching converter that receives an input voltage of one polarity and outputs a voltage of the same polarity that is larger than the input voltage. A buck converter is another type of DC-to-DC switching converter that receives an input voltage of one polarity, and outputs a voltage of the same polarity that is smaller than the input voltage.

FIG. 1A shows a block diagram of an embodiment of an exemplary prior art buck converter 100. As shown in FIG. 1A, converter 100 has a power supply circuit 102 that receives a pulse width modulated signal PWS and generates a supply voltage VDD in response to the pulse width modulated signal PWS.

Power supply circuit 102 comprises a DC voltage source 110 and an n-channel MOS transistor 112 that has a source, a drain connected to voltage source 110, and a gate connected to receive the pulse width modulated signal PWS. Power supply circuit 102 also comprises a diode D that has an input connected to ground, and an output connected to the source of transistor 112.

Power supply circuit 102 also comprises an inductor L and a capacitor C that form an LC network. Inductor L has a first end connected to the source of transistor 112, and a second end connected to a supply node NS. Capacitor C has a first end connected to the supply node NS and a second end connected to ground. In addition, a load 114 is connected between the supply node NS and ground.

In operation, the pulse width modulated signal PWS turns transistor 112 on and off, which outputs a pulsed current to the LC network. The LC network averages the pulsed current to generate the supply voltage VDD on the supply node NS. The supply voltage VDD has a value that is approximately equal to the duty cycle of the pulse width modulated signal PWS multiplied times the voltage of voltage source 110. For example, when a fifty percent (50%) duty cycle signal is used with a two volt (2 V) voltage source, a supply voltage VDD of approximately one volt (1 V) results.

Diode D is used to provide a continuous conductive path for inductor L. When transistor 112 turns on, current is driven into inductor L, which stores the energy. When transistor 112 turns off, the stored energy is transferred to capacitor C as the voltage on the input of inductor L drops below ground. When the voltage on the input of inductor L drops below ground, diode D turns on, thereby providing a continuous conductive path.

Referring again to FIG. 1A, converter 100 also comprises a compensation circuit 116 that adjusts the duty cycle of the pulse width modulated signal to maintain a roughly constant supply voltage VDD in response to changes in process, voltage, and temperature (PVT).

As shown in FIG. 1A, compensation circuit 116 comprises an adjuster block 120 that divides down (or gains up) the supply voltage VDD on the supply node NS to output an adjusted voltage VA. In addition, compensation circuit 116 comprises an error block 122 that compares the adjusted voltage VA to a band gap reference voltage VBG to generate an error voltage VER.

Compensation circuit 116 further comprises a proportional integrator differentiator (PID) 124 that responds to changes in the error voltage VER, and outputs a control voltage VC in response thereto, and a pulse width modulator 126 that outputs the pulse width modulated signal PWS.

The LC network is a two pole resonant system that stores energy. As a result, any transient introduced to the system, such as a start up transient or a load transient, causes a disturbance. The disturbance causes a response through the LC network that produces an oscillation or a ringing effect.

PID 124 eliminates the ringing effect by providing a zero that cancels one of the poles in the LC network. Canceling one of the poles, in turn, results in a first order system that is inherently stable. In this manner PID 214 converts the second order response of the LC network to a first order response.

Pulse width modulator 126 varies the positive widths (duty cycles) of the pulses in the pulse width modulated signal PWS in response to the control voltage VC output by PID 214. For example, a centered control voltage produces a pulse width modulated signal PWS with a fifty percent (50%) duty cycle. In addition, a driver block 128 drives the pulse width modulated signal PWS onto the gate of transistor 112.

In operation, the band gap reference voltage VBG is generated by a band gap circuit, and is roughly constant over changes in process, voltage, and temperature (PVT). Under normal operating conditions, the adjusted voltage VA and the band gap reference voltage VBG are equal and the error voltage VER is zero. A zero error voltage produces a control voltage VC that, in turn, produces a pulse width modulated signal PWS.

When the adjusted voltage VA varies due to changes in PVT, error block 122 outputs the error voltage VER with a non-zero value. PID 124 filters the error voltage VER to output a control voltage VC. Pulse width modulator 126 responds to the control voltage VC by varying the duty cycle of the pulse width modulated signal PWS which, in turn, changes the supply voltage VDD. This process continues until the adjusted voltage VA and the band gap voltage VBG are again equal.

Thus, compensation circuit 116 adjusts the duty cycle of the pulse width modulated signal PWS to maintain a roughly constant supply voltage VDD in response to changes in process, voltage, and temperature (PVT).

One drawback of switching converter 100 is that diode D introduces an undesirable resistance. One approach to reducing the resistance introduced by diode D is to use a synchronous rectifier. FIG. 1B shows a block diagram that illustrates a typical prior art synchronous rectifier 150.

As shown in FIG. 1B, synchronous rectifier 150 comprises a PMOS driver transistor 152 that has a source connected to a supply voltage VDD, a drain connected to inductor L through an inductor node NL, and a gate. Synchronous rectifier 150 also comprises a NMOS driver transistor 154 that has a source connected to ground, a drain connected to inductor L through the inductor node NL, and a gate.

As also shown in FIG. 1B, synchronous rectifier 150 also comprises a gate signal generator 156 that receives a pulse width modulated signal PWS, and outputs non-overlapping gate signals G1 and G2 to PMOS transistor 152 and NMOS transistor 154, respectively.

In operation, when the pulse width modulated signal PWS transitions low, generator 156 turns off NMOS transistor 154 via gate signal G2, and then turns on PMOS transistor 152 via gate signal G1. When PMOS transistor 152 turns on, transistor 152 sources current into inductor node NL.

When the pulse width modulated signal PWS transitions high, generator 156 turns off PMOS transistor 152 via gate signal G1, and then turns on NMOS transistor 154 via gate signal G2. When NMOS transistor 154 turns on, transistor 154 provides a path to ground to provide a continuous conductive path at the inductor node NL for an inductor.

Another drawback of switching converter 100 is that the converter requires a band gap reference voltage source to respond to changes in PVT. A band gap reference voltage source, however, is a complex circuit that provides only a roughly constant voltage over changes in PVT.

A further drawback of switching converter 100 is that switching converter 100 requires a proportional integrator differentiator (PID), which is also a complex circuit, in order to compensate for the second order effects of the LC network. The implementation of a PID circuit adds a heavy hardware burden because a PID control law is typically expressed as a current and prior values of duty ratio, and error, and includes coefficients that require evaluation using multiplication.

In view of the disadvantages inherent in the prior art switching converter circuitry, it would be advantageous to have an improved system and method for compensating for the impact of operational and intrinsic parameter fluctuations on circuit performance by adaptively adjusting the supply voltage to guarantee proper operation of digital processors. It would be advantageous to have an improved system and method for providing a DC-to-DC switching converter that provides a substantially constant supply voltage over changes in PVT without employing a band gap reference voltage source and without employing a PID circuit.

It would also be advantageous to have an improved system and method for digitally self-adjusting a minimum power supply system to regulate a power supply voltage to a minimum value required to operate at a given PVT and a given frequency.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 5 is a timing diagram of delayline outputs and clock signals of the present invention;

FIG. 10 is a diagram illustrating supply voltages corresponding to equivalent propagation delay for a best case condition, a typical case condition, and a worst case condition;

DETAILED DESCRIPTION OF THE INVENTION

FIGS. 2 through 17, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged electronic device.

Figure 1A:
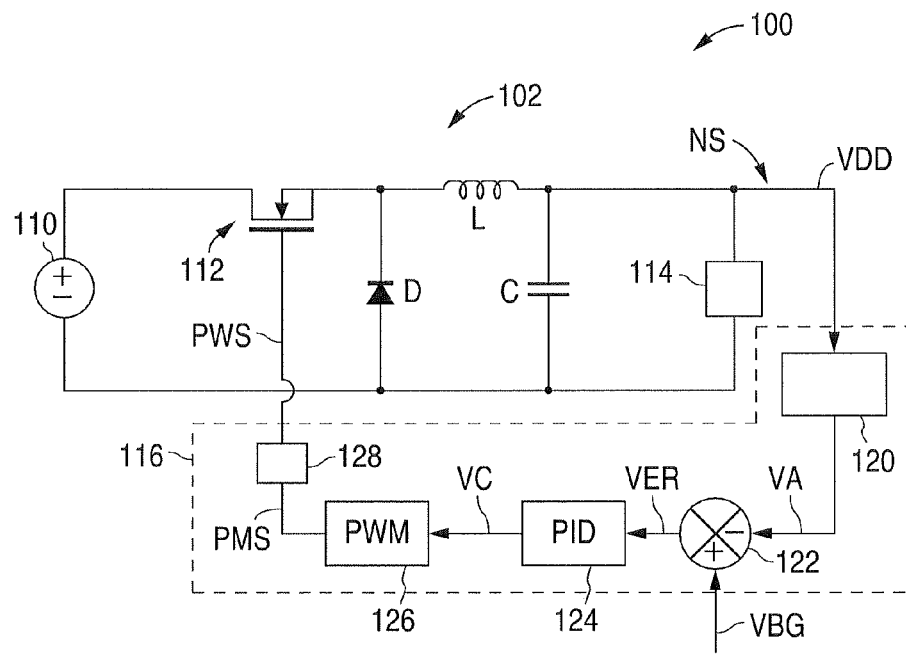
FIG. 1A is a block diagram illustrating a prior art buck converter 100.
Figure 1B:
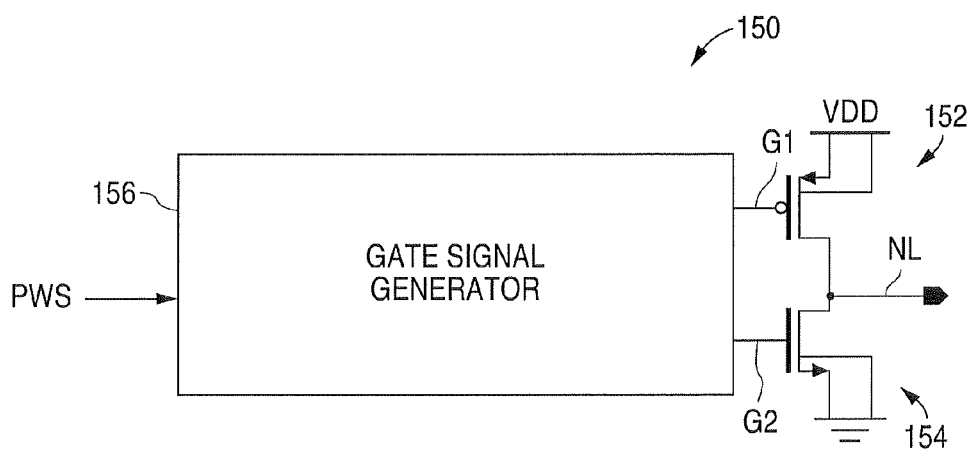
FIG. 1B is a block diagram illustrating a prior art synchronous rectifier 150.
Figure 2:
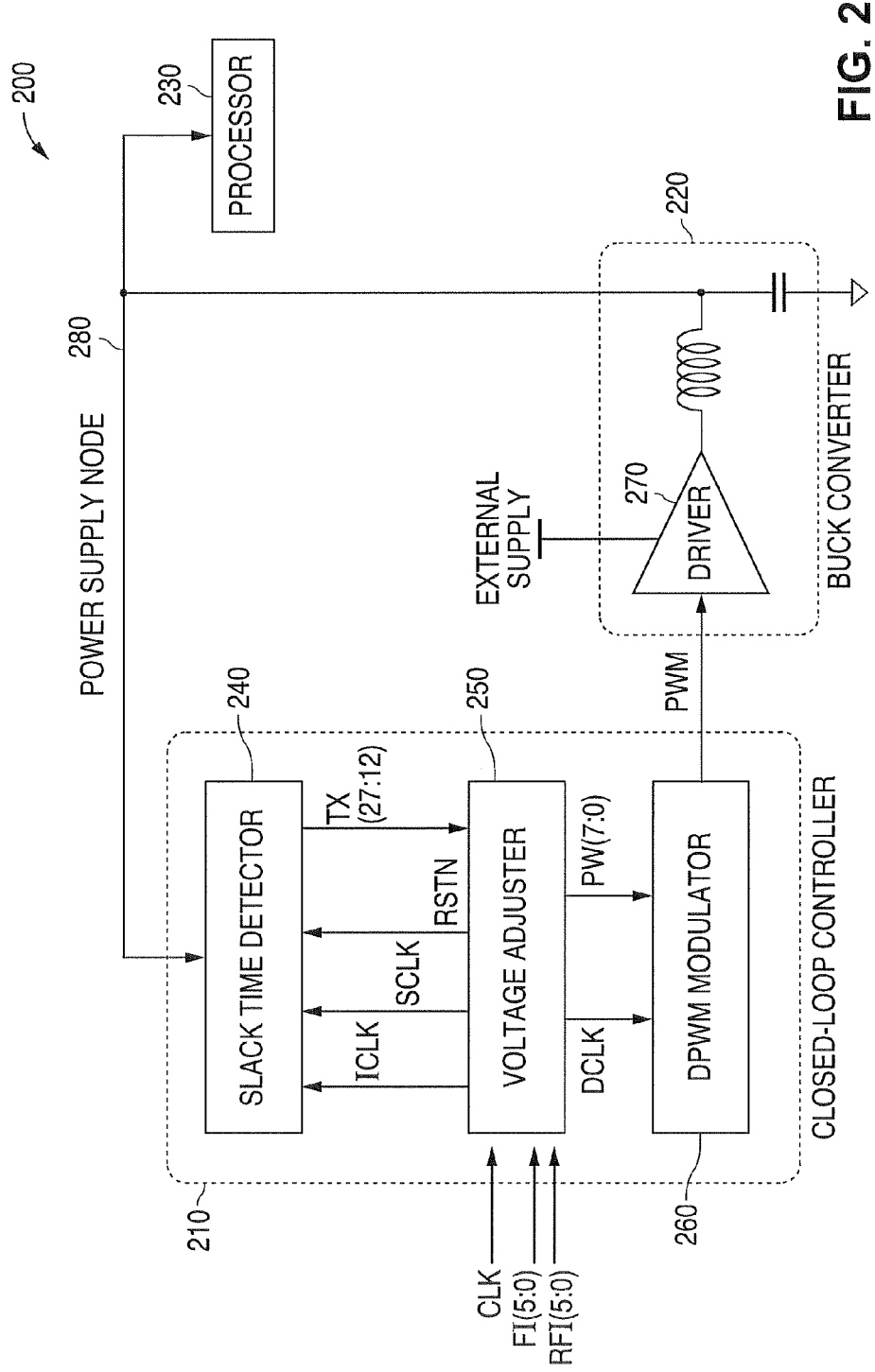
FIG. 2 is a block diagram illustrating a digital self adjusting minimum power supply system in accordance with the principles of the present invention.

FIG. 2 is a block diagram illustrating a digital self adjusting minimum power supply system 200 in accordance with the principles of the present invention. The system 200 comprises a closed loop controller 210 that receives a fixed frequency clock signal CLK and frequency information FI(5:0), a DC-DC buck converter 220, and a processor 230 as a load current source. The closed loop controller 210 comprises a slack time detector 240, a voltage adjuster 250, and a pulse width modulation (PWM) modulator 260.

The closed loop controller 210 performs the following discrete-time compensation:

$$D(n+1)=F(n)+\alpha E(n)+A(n) \qquad (3)$$

The expression D(n+1) represents the next value of the duty ratio. The expression F(n) represents the frequency compensation factor. The expression E(n) represents the detected error. The expression A(n) represents the accumulated compensation. The expression alpha ($\alpha$) represents an error scaling factor.

In indicated the expression in Equation (3), the control approach does not request any previous values, although an accumulated compensation factor A(n) is needed. The variations of PVT and load are dynamically updated in the compensation factor. During updating, the duty ratio is controlled by a finite state machine (FSM) that maintains a substantially constant supply voltage. The error scaling factor alpha ($\alpha$) is used to increase the error resolution and it is implemented by a right shift function instead of multiplication.

Figures 3, 4:
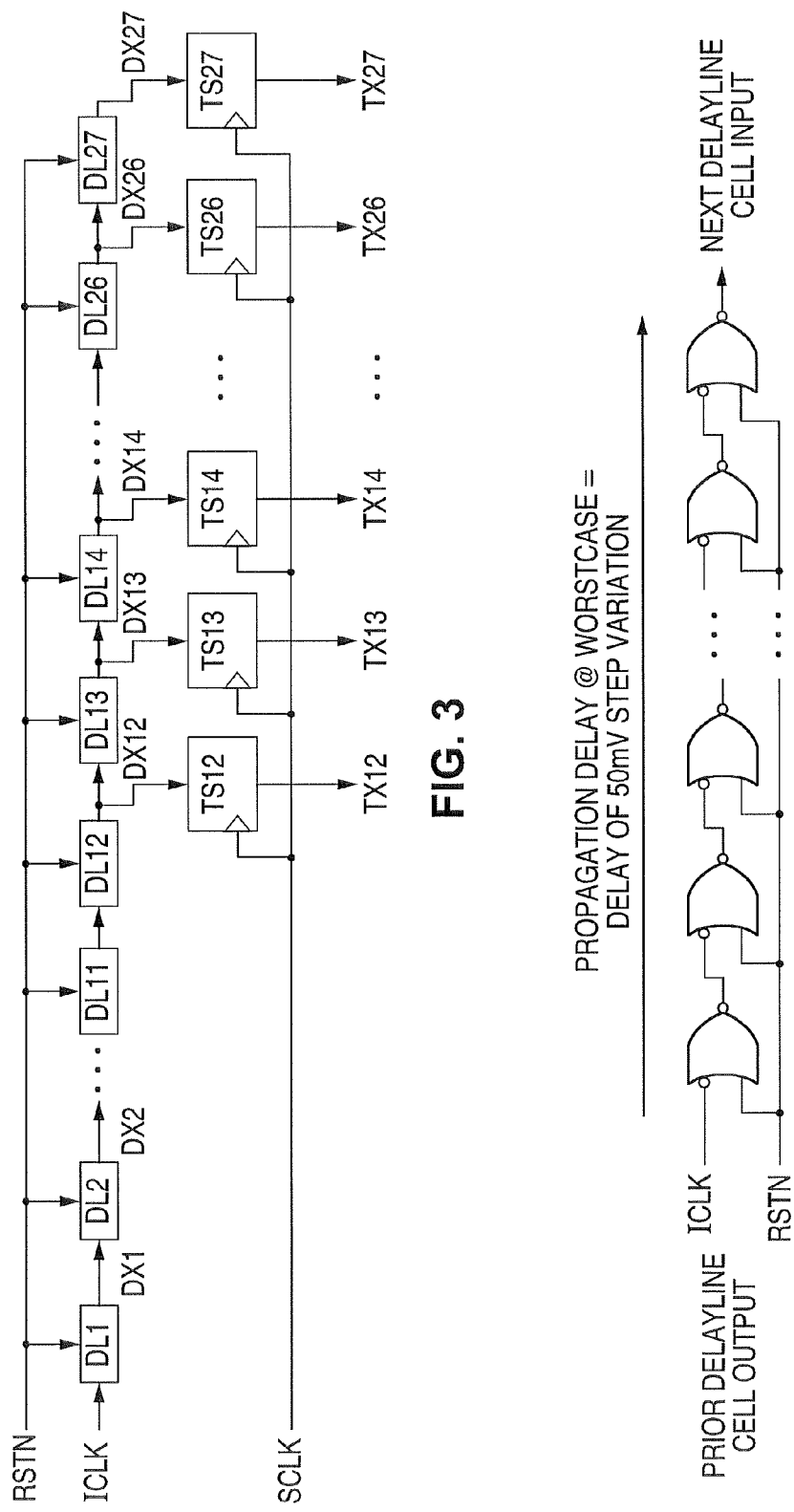
FIG. 3 is a circuit diagram illustrating a slack time detector of the present invention.
FIG. 4 is a circuit diagram of an exemplary delay cell of the slack time detector shown in FIG. 3.

The ability to determine the minimum voltage required for a given operating frequency needs to continuously monitor a critical path delay through the digital circuitry with respect to PVT, load, and frequency. This is referred to as a slack time detection. The slack time detector 240 of the present invention comprises a chain of delay cells (DL1 through DL27), and a tap register (TS12 through TS27) as shown in FIG. 3. A circuit diagram of an exemplary delay cell of the slack time detector 240 is shown in FIG. 4.

The principle of a delayline as an analog to digital converter (ADC) is based on the relation between a supply voltage and the propagation delay. The slack time detector 240 determines the voltage level of the delayline's supply according to the propagation delay through the delayline. In other words, the delay along with the supply voltage is converted to a digital value by sampling the delayline.

There are three considerations for designing a delayline to monitor the critical path timing over PVT variation. The first requirement is to avoid the worst case cross-over effect on non-linear characteristics between delay and voltage. The cross-over is worse when the delay becomes longer or the voltage becomes lower. Therefore, the margin for proper circuit operation should be applied for high cross-over ratio.

The second requirement is to determine the resolution of the delayline. A fine step size can result in very slow settling. On the other hand, a coarse step size can cause hysteretic oscillation. The third requirement is to minimize the hardware burden for the delayline. As semiconductor fabrication technology improves, the circuit delay is shorter, and in turn the number of needed cells to implement a critical path delay is larger.

From the third delayline design requirement, the cells of the delayline should have low performance. A NOR structure slowly transits at a high-to-low transition compared to a NAND structure. However, low-to-high transition time of a NOR gate is the same as that of a NOT gate. Therefore, a pair of NOR and NOT gates is selected as the unit delay cell.

The number of delay cells between taps is determined so that the accumulated steps voltage by increasing a step voltage makes one more tap active than the prior accumulated steps voltage at the worst case. The number of delay cells between taps varies because the propagation delay is not a linear function of the supply voltage.

The inverted input of the delay cell (NOR-INV) receives the input clock signal or the output of the delay cell, and the non-inverted input is connected to a delayline enable signal. The sampling clock signal is lagged from the input clock signal by one quarter (¼) of a period. The tap register samples the values of the delayline at one quarter (¼) period intervals after the input clock pulse has begun propagating through the delayline. FIG. 5 shows the timing of the inputs DX12 through DX27 at each tap, the input clock signal ICLK, the sample clock signal SCLK, and the delayline enable signal RSTN.

The magnitude of the supply voltage is inferred by determining how far along the delayline the input clock pulse propagates in one fourth (¼) of a period. Therefore, a delayline in the negative feedback path of a closed loop reflects variations in circuit performance in response to variations of PVT, load and frequency and adaptively scales the regulated voltage of a buck converter via a loop controller.

The delayline is characterized at the worst case with regard to fixed frequency input sources. Delay of the delayline implies its process corner, junction temperature, and supply voltage at a given workload. From this measurement, a desirable constant supply voltage in response to variations of PVT and load can be determined to guarantee the propagation delay just less than the critical path delay limitation that assures proper operation.

Figure 6:
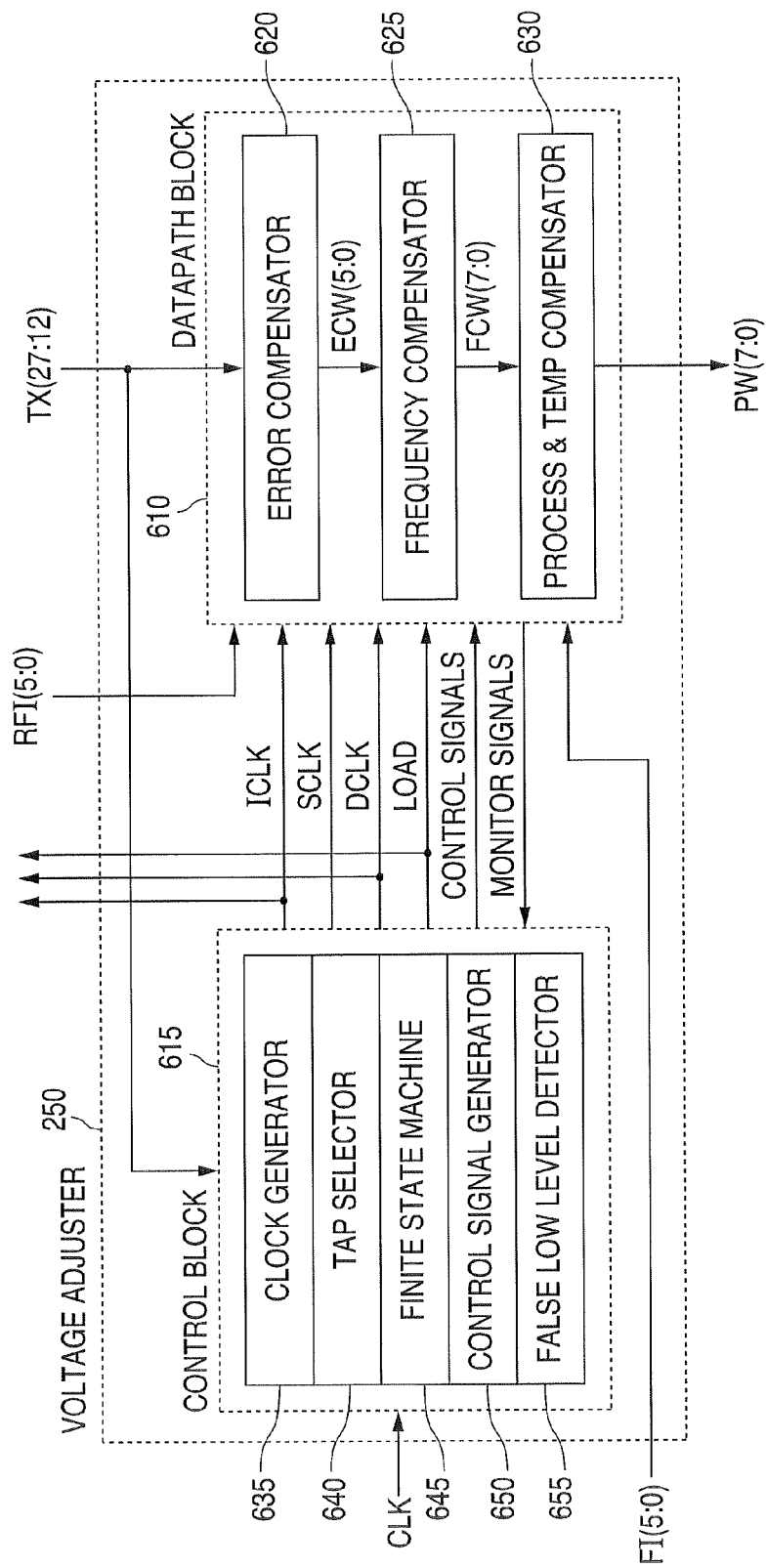
FIG. 6 is a block diagram illustrating a voltage adjuster of the present invention.

As shown in FIG. 6, the voltage adjuster 250 comprises a datapath block 610 and a control block 615. Datapath block 610 comprises an error compensator 620, a frequency compensator 625, and a process, voltage, and temperature (PVT) compensator 630. The major role of the voltage adjuster 250 is to compensate a supply voltage error at a given frequency from the measurement of the slack time detector 240 and to provide a desirable constant voltage level against variations of frequency as well as PVT. In addition, for high-speed and low-overshoot/undershoot start-up, it controls soft-start operation.

Figure 7:
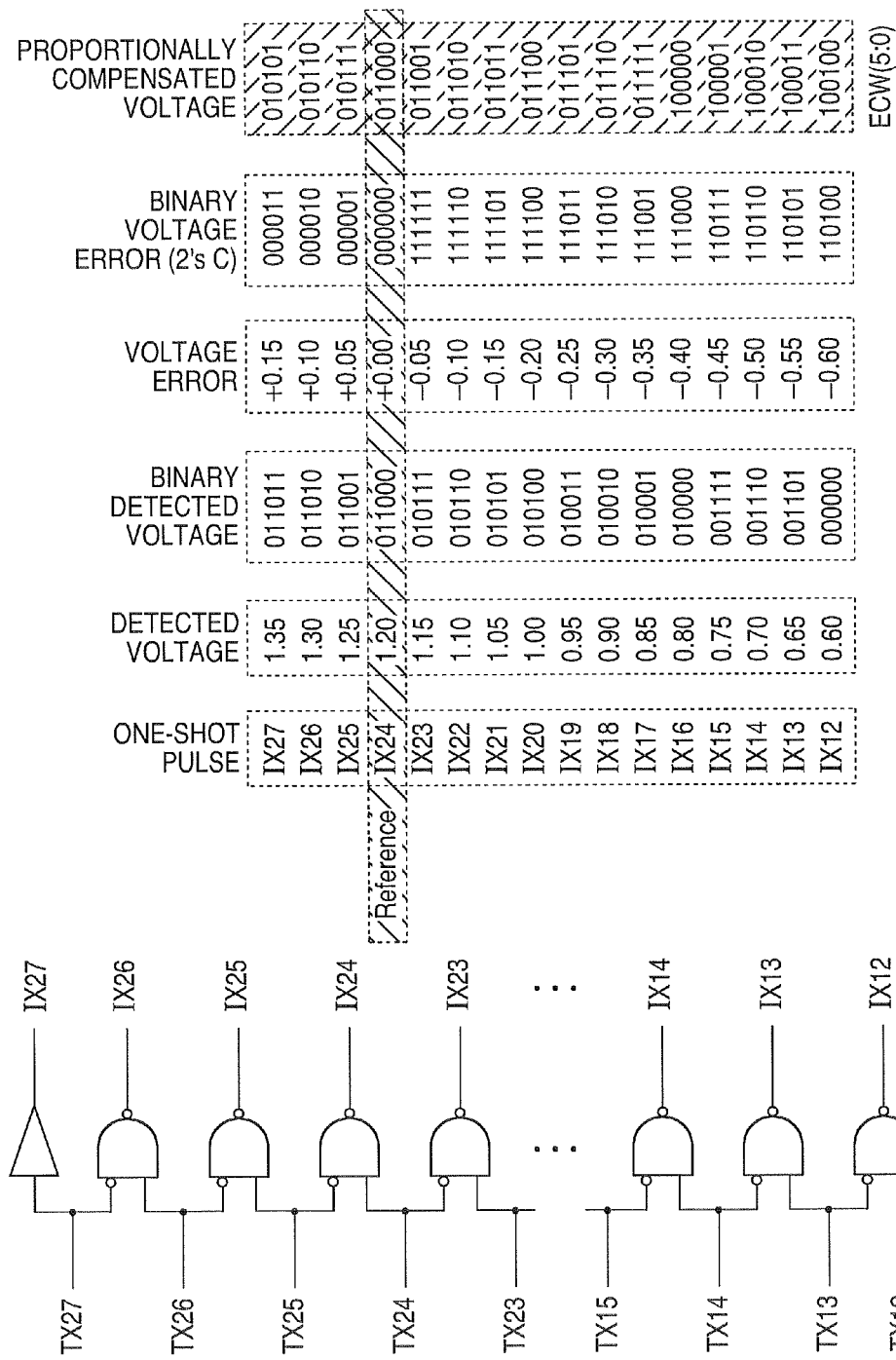
FIG. 7 is a block diagram illustrating a one zero edge detector and an illustrative example of an encoding procedure of the present invention.

Error Compensator. The role of the error compensator 620 is to detect the voltage error E(n) (in Equation (3)), and to generate a proportionally compensated value. It receives the propagation delay word TX(27:12) from the slack time detector 240 and detects the position of one and zero pair of taps as shown in FIG. 7. The error compensator 620 converts the propagation delay position to an error voltage E(n) by comparing it to the reference delay position along with supply voltage at the worst case, and in turn generates a proportionally compensated delay word ECW(5:0) that represents a reference value at a default frequency plus a compensated error value.

Figure 8:
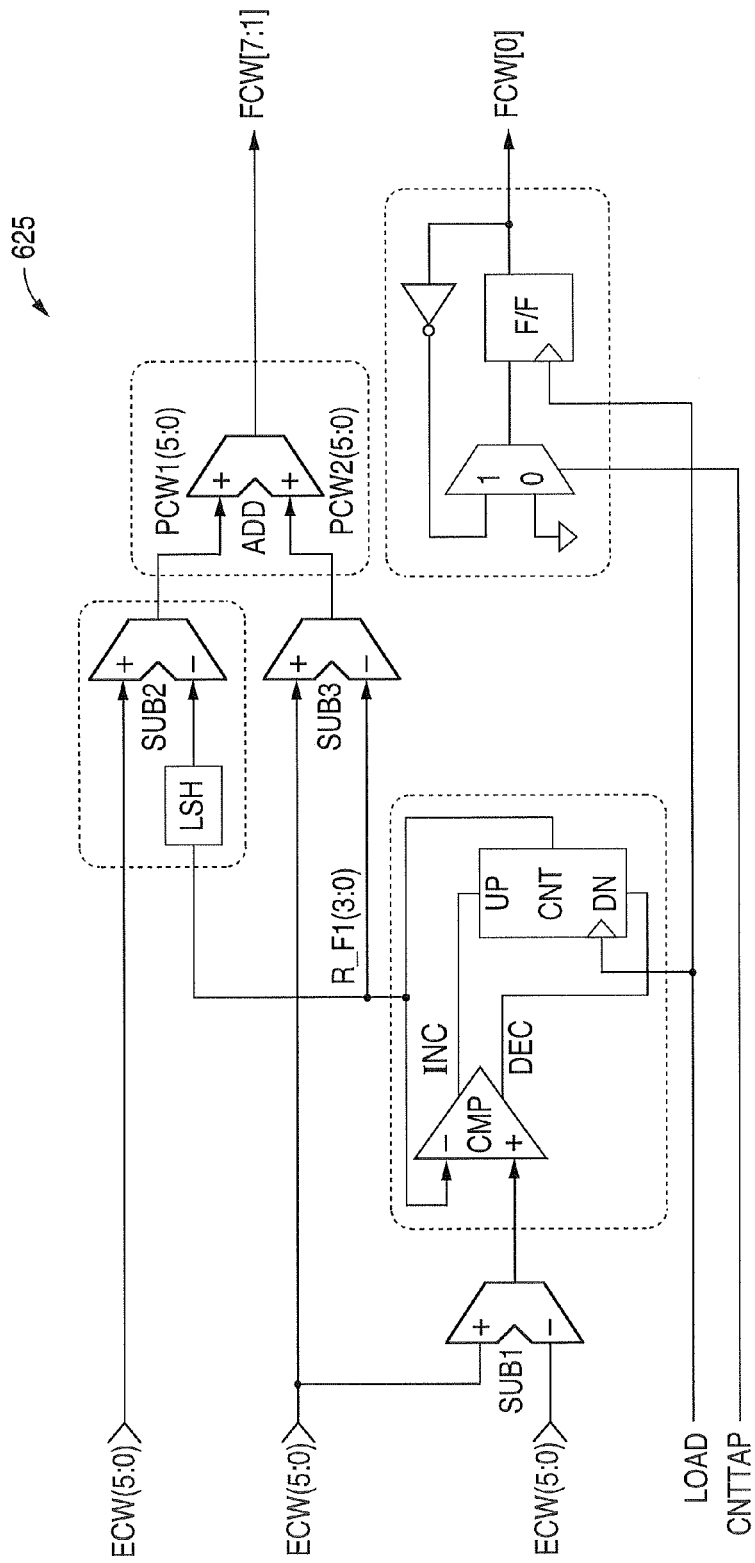
FIG. 8 is a block diagram illustrating a frequency compensator of the present invention.

Frequency Compensator. The frequency compensator 625 adjusts the duty cycle of the pulse width modulated (PWM) pulse according to the desirable supply voltage in response to a given frequency. A more detailed view of the frequency compensator 625 is shown in FIG. 8. The first subtractor SUBL1 in FIG. 8 generates a difference between the frequency information FI(5:0) and the internal reference voltage level RFI(5:0). The difference implies the desirable voltage variation in response to a given frequency.

The up/down counter CNT receives the difference, and counts up or down at the load signal LOAD until the output of the counter equals the difference. This prevents the desirable supply level along with the frequency variation from abruptly changing to reduce the ringing effect. The second subtractor SUB2 receives the proportionally compensated propagation delay word ECW(5:0) from the error compensator 620 and the shift-left counter number for subtrahend (from the left shift circuit LSH), and generates a frequency compensated propagation delay word FCW1(5:0).

The compensated error-step from the delayline is the same as the resolution of the delayline which is six (6) bits. However, the resolution of the digital-to-analog converter (DAC) should be higher than that of the analog-to-digital converter (ADC), and the error step should have higher resolution. To increase the control resolution, the proportionally compensated error-value should be scaled close to the resolution of the DAC.

The third subtractor SUB3 provides a reference supply voltage word FCW2(5:0) at a given frequency FI(5:0). The one bit higher resolution compensated word FCW(7:1) is generated by adding the frequency compensated word to the reference supply voltage word. However, the seven (7) bit digital-to-analog converter (DAC) for the six (6) bit analog-to-digital converter (ADC) is not enough to avoid limit-cycling.

Therefore, dither logic generates a least significant bit (LSB) of the frequency compensated word FCW(0). The LSB is toggled (average value) unless the desirable voltage is not achieved. When the supply voltage reaches a target voltage, it is set to zero. The frequency compensated word represents the reference value plus half of the compensated error value, and an additional least significant bit (LSB). The frequency compensated word FCW(0) corresponds to the frequency compensated factor F(n) in Equation (3).

Figure 9:
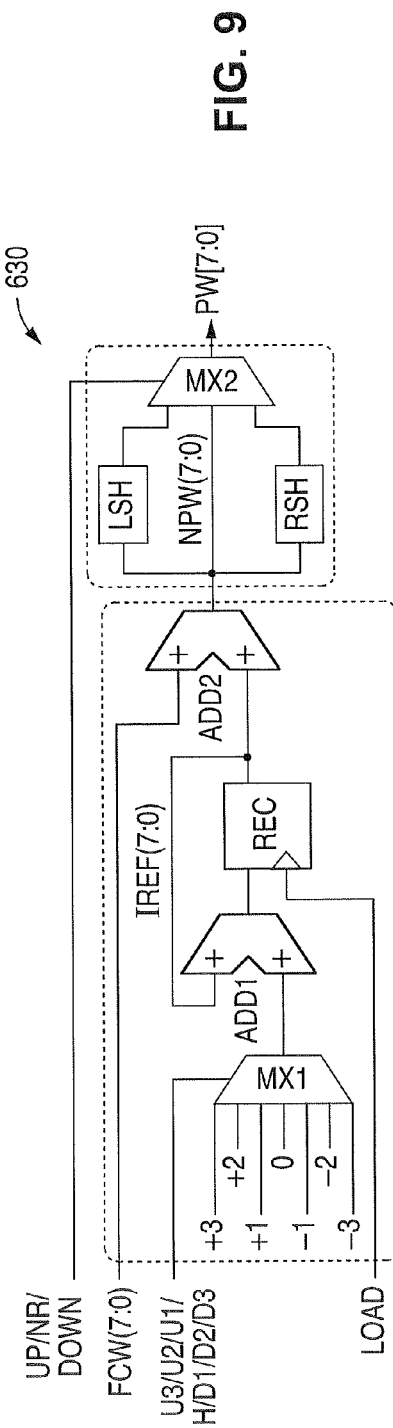
FIG. 9 is a block diagram illustrating a PVT compensator of the present invention.

Process, Voltage, and Temperature (PVT) Compensator. The process, voltage, and temperature (PVT) compensator 630 comprises an internal dynamic voltage reference source MX1, a pulse width generator ADD1, and a ringing stopper MX2 as shown in FIG. 9. The internal dynamic voltage reference source MX1 adds or subtracts one, two, or three steps according to the one (1) step, two (2) steps, or three (3) steps increment or decrement indicators (U1, U2, U3, D1, D2, D3) and generates an internal dynamic voltage reference IREF(7:0).

The reference value compensates the fluctuations due to process and temperature variations as well as the quantization error of external supply voltage. FIG. 10 illustrates the equivalent supply voltages that ensure the same propagation delay at different operational and intrinsic parameters. FIG. 10A illustrates a supply voltage corresponding to a best case.

FIG. 10B illustrates a supply voltage corresponding to a typical case. FIG. 10C illustrates a supply voltage corresponding to a worst case.

The pulse width generator ADD2 receives the frequency compensated word FCM(7:0) and the accumulated compensation IREF(7:0). The accumulated compensation IREF(7:0) corresponds to the accumulated compensation factor A(n) in Equation (3). The pulse width generator ADD2 generates a normal PWM pulse width NPW(7:0).

The ringing stopper MX2 receives three inputs. They are the shift-left PWM pulse width (from the left shift circuit LSH), the normal PWM pulse width, and the shift-righted PWM pulse width (from the right shift circuit RSH). The ringing stopper MX2 outputs a pulse width word PW(7:0) in response to selection signals UP, NR, and DOWN. Because the high-valued derivative direction of supply voltage during frequency-changing or starting-up is not changed by only step-size compensated value NPW(7:0), the emphasized activation (double or half size of the PWM pulse) is needed.

Control Block of Voltage Adjuster. As shown in FIG. 6, the control block 615 comprises a clock generator 635, a tap selector 640, a finite state machine (FSM) 645, a control signal generator 650, and a false low level detector 655.

Figure 11:
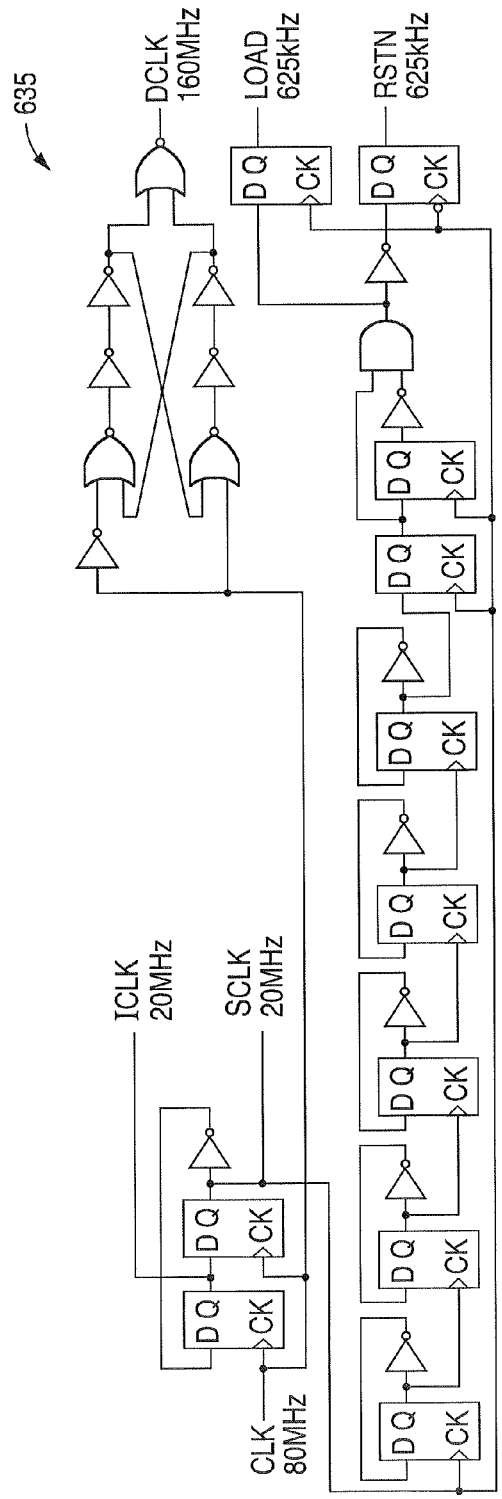
FIG. 11 is a circuit diagram illustrating a clock generator of the present invention.
Figure 12:
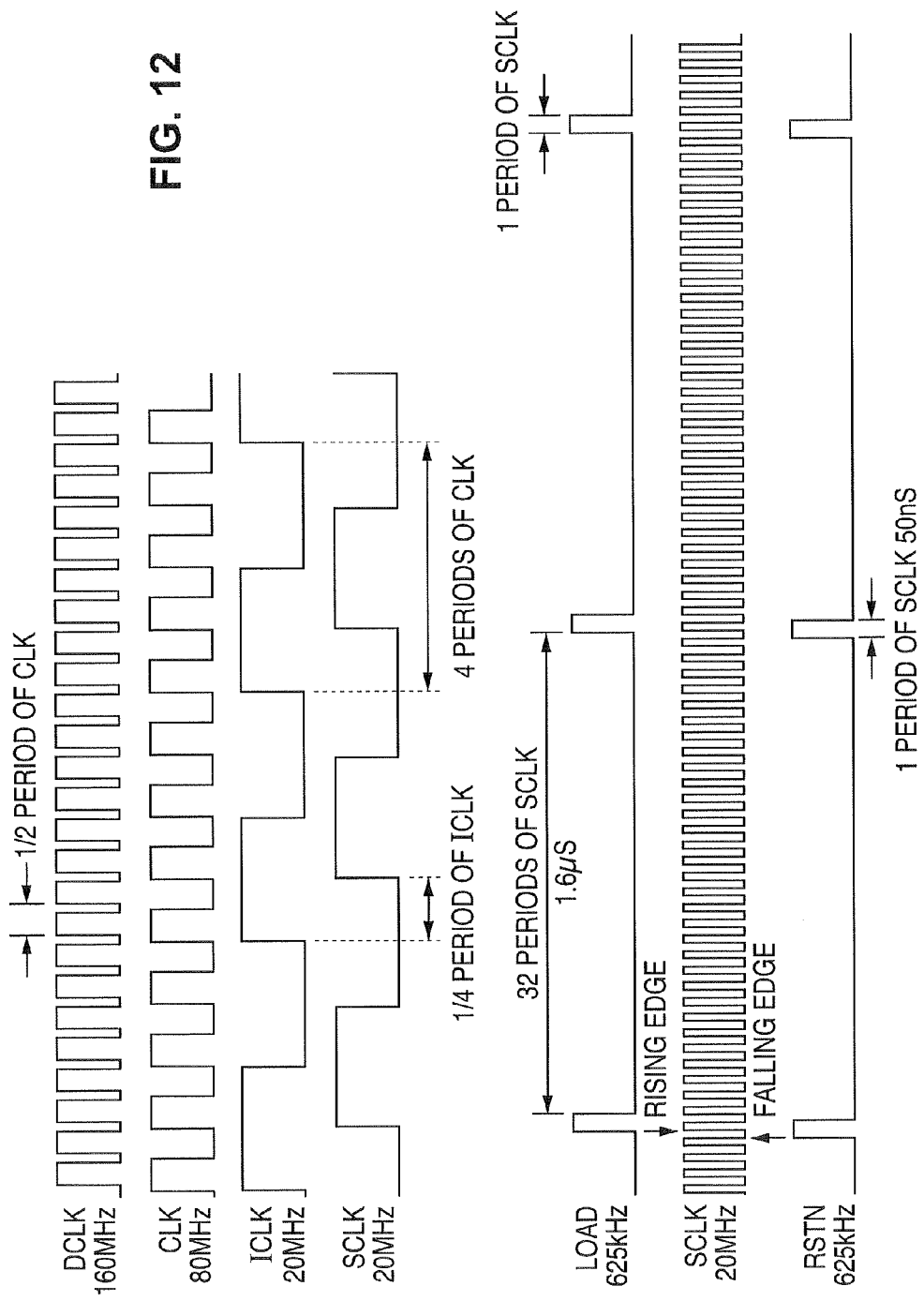
FIG. 12 is a timing diagram of clock signals of the clock generator of the present invention.

FIG. 11 is a circuit diagram illustrating an advantageous embodiment of the clock generator 635. FIG. 12 is a timing diagram of the clock signals of the clock generator 635. The clock generator 635 outputs a one quarter (¼) frequency input clock signal ICLK and a one quarter (¼) period lagged sample clock signal SCLK from an external clock input CLK. The clock generator 635 also outputs a one thirty second (1/32) frequency PWM loading signal LOAD and a delayline reset signal RSTN from the sample clock signal SCLK. The clock generator 635 also outputs a frequency doubled clock DCLK from the external input clock CLK.

Figure 17:
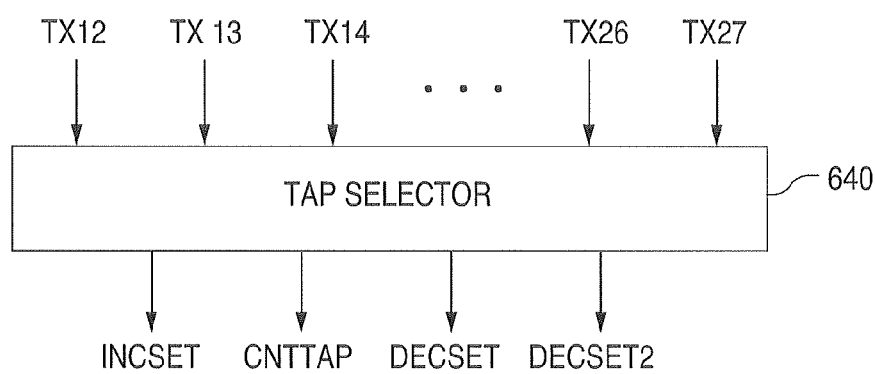
FIG. 17 is a diagram illustrating how a tap selector of the invention chooses four tap signals from sixteen tap signals of a slack time detector.

As shown in FIG. 17, in response to external frequency information FI(5:0) the tap selector 640 chooses four (4) taps (such as prior-tap INCSET, center-tap CNTTAP, next-tap DECSET, and next next-tap DECSET2) from the sixteen (16) taps (TX12-TX27) of the slack time detector 240. The control signal generator 650 outputs increment or decrement indicators UP, UP3, DOWN, and DOWN3 in response to the status of the four (4) taps of the tap detector, the state CS2-CS0 from the Finite State Machine (FSM) 645, and external frequency information.

Figure 13:
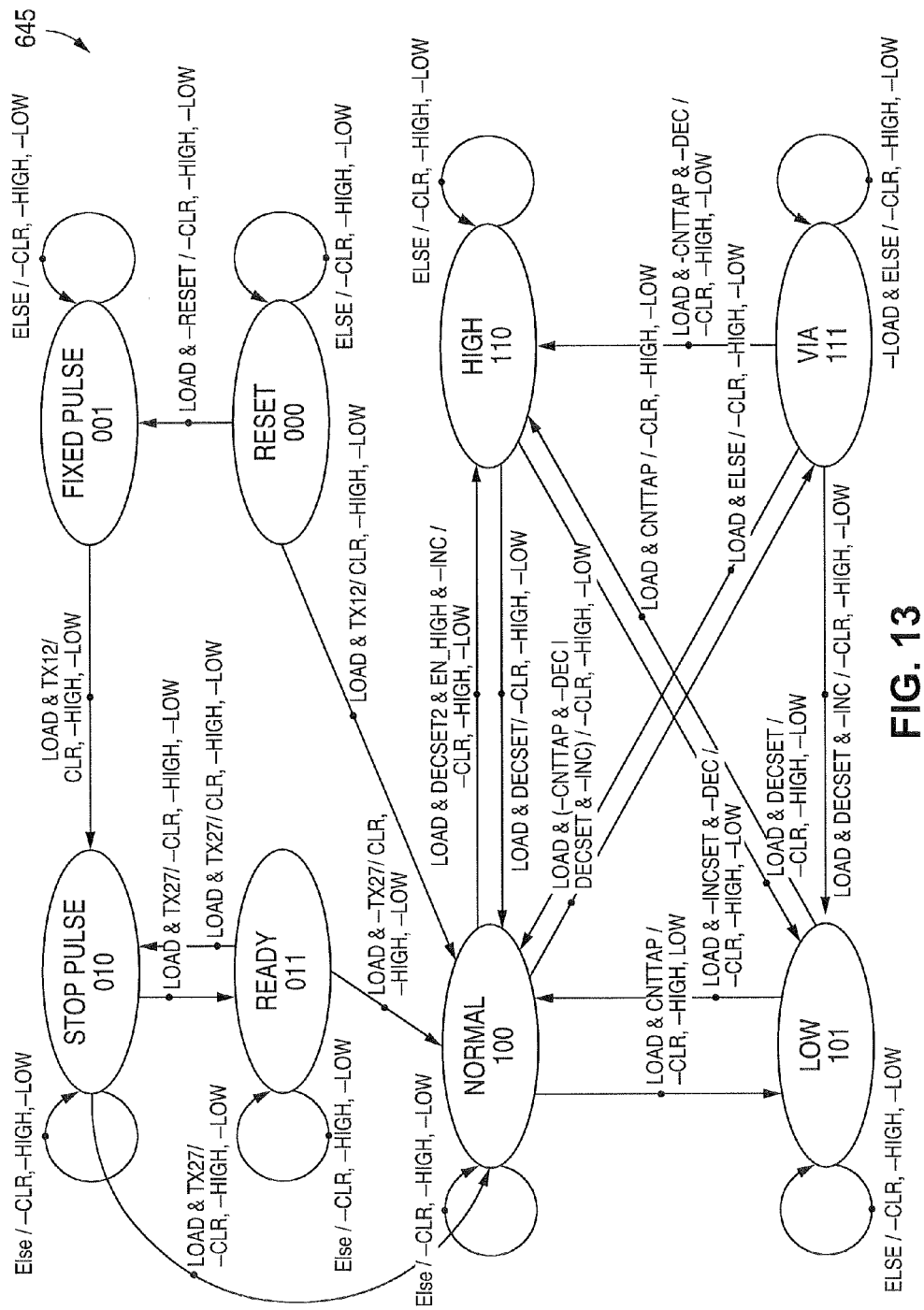
FIG. 13 is a state diagram illustrating the states of the finite state machine of the present invention.

The Finite State Machine (FSM) 645 is shown in more detail in FIG. 13. The Finite State Machine (FSM) receives monitor signals from the other control modules and the datapath block 610, and outputs control signals to the datapath block 610. The monitor signals comprise the first tap TX12, the last tap TX27, the four (4) taps INCSET, CNTTAP, DECSET, and DECSET2, two frequency change indicators (INC and DEC), and the external frequency information FI(5:0). The control signals comprise a current state CS(2:0), a low voltage state signal LOW, a high voltage state signal HIGH, and a clear signal CLR of a PWM pulse width counter.

The states from 000 to 011 control a soft-start routine to avoid large overshoot/undershoot with high-speed saturation. In the states from 100 to 111, the FSM 645 controls a duty cycle of the digital pulse width modulation (DPWM) modulator 260 according to the current voltage status detected by the value of the four (4) taps that varies over PVT conditions. The outputs of the FSM 645 are used to change the counter number of the PVT compensator at weighted steps and to double or half of the compensator number. This accelerates the supply voltage to be stable fast over various value of PVT in start-up as well as in normal operation.

The DAC's higher resolution than that of the ADC gives multiple DAC values for a given ADC output. During a high to low voltage transition along with frequency change, the highest voltage among the DAC level at the same ADC level may be a settling point. The false low-level detector 655 steps down the voltage level until a true minimum DAC level according to a given frequency is detected.

Figure 14:
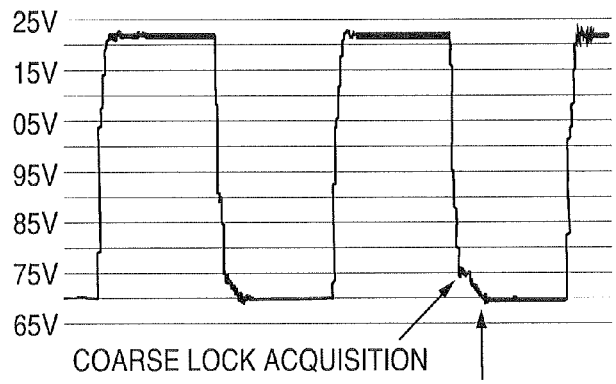
FIG. 14 is a diagram illustrating lock acquisitions of the supply voltage in accordance with the principles of the present invention.

As shown in FIG. 14, the supply voltage settles down at the first high DAC level in an ADC bin by the operation of the FSM 645 (Coarse Lock Acquisition), and in turn converges to the bottom DAC level by the operation of the false low level detector 655 (Fine Lock Acquisition).

Figure 15:
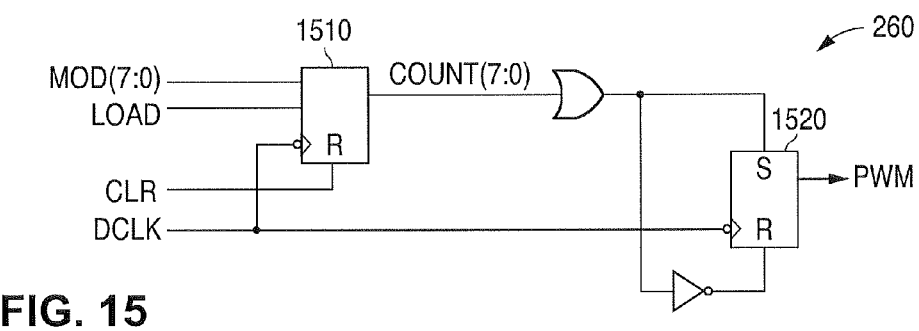
FIG. 15 is a block diagram illustrating a pulse width modulation (PWM) modulator of the present invention.

DPWM Pulse Modulator. FIG. 15 illustrates a more detailed view of the DPWM Pulse Modulator 260. The DPWM Pulse Modulator 260 comprises a loadable down counter 1510 and a pulse generator 1520. The down counter 1510 loads the PWM pulse width PW(7:0) from the voltage adjuster 250 by the load signal LOAD, changing a binary output of down counter 1510 as a count in response to the frequency doubled clock signal DCLK. DPWM Pulse Modulator 260 outputs a pulse modulated signal PWM defined by the binary input value PW(7:0) of down counter 1510.

The single loop design of the present invention eliminates most of the analog circuit including references, ramp generators, and ADC comparators that are usually associated with analog synchronous buck converters. A driver chip that is less than one millimeter (1 mm) on a side can easily be manufactured and placed in a low cost SOT23-5 or a μSMD bump chip package.

A one half micron (0.5 μm) power CMOS process serves as an excellent choice for the driver for power supplies less than five and one half volts (5.5 V) which is the case in virtually all present day cell phones. Additional features such as over and under voltage protection, thermal shutdown, and dead time (non overlapping phase) can also be included. The driver can be made with an arbitrarily large current (e.g., one ampere) without significantly impacting stability and efficiency. The driver chip can also be directly driven from a low voltage source because level shifters are included in the input. In addition, the need for trims and voltage corrections that are normally associated with analog switcher circuits are eliminated.

The digital self-adjusting minimum power supply system of the present invention comprises a driver 270 having an input connected to the DPWM Modulator 260. As shown in FIG. 2, driver 270 drives an LC filter. The LC filter generates a DC supply voltage on adaptive voltage scaling (AVS) Power Supply Node 280 in response to a pulse modulated signal PMS. Because the LC filter is an intermittently unstable system, it is very important to choose proper values for the inductance L and the capacitance C.

From the maximum ripple requirement, the LC product can be chosen from Equation (4):

$$\Delta V \leq \frac{V_{in} D(1-D)}{8 f_{SW}^2 LC} \quad (4)$$

The expression $\Delta V$ represents the ripple voltage. The expression Vin represents the input voltage. The letter D represents the duty ratio. The expression $f_{SW}$ represents the switching frequency. The expression LC represents the product of the inductance L and the capacitance C.

Consider the following numerical example. If the output voltage Vout is 1.2 volts and the input voltage Vin is 3.6 volts, and if the ripple voltage $\Delta V$ is 5.0 millivolts, and the switching frequency f is six hundred twenty five kiloHertz (625 kHz), then the required value of the LC product is fifty one and two tenths microseconds squared (51.2 µsec²).

The minimum oscillation (damped natural) frequency is expressed in Equation (5) as follows:

$$\omega_d = \sqrt{\frac{1}{LC} - \frac{R^2}{4L^2}} \quad (5)$$

The expression ωd represents the damped natural frequency. The inductance is L and the capacitance is C. The resistance R is the sum of the resistances of switch TR and ESR. From Equation (5) the minimum ωd condition is expressed in Equation (6) as follows:

$$\frac{2}{R}\sqrt{\frac{L}{C}} = 1 \quad (6)$$

The widths of the Field Effect Transistor (FET) drivers are sized so that the resistance R is one ohm (1Ω) in Equation (1). Therefore, the numerical value of capacitance C is approximately four (4) times the numerical value of inductance L. Using the value LC=51.2 µsec² one obtains an approximate value of inductance L=3.58 microHenries (µH) and an approximate value of capacitance C=14.31 microFarads (µF).

The digital self-adjusting minimum power supply system of the present invention provides a closed loop automatic supply adjustment mechanism to generate the optimum operating voltage for core processors in response to variations in PVT as well as those of frequency and load.

The switching frequency of the buffer is six hundred twenty five megahertz (625 MHz). The Digital Pulse Width Modulation (DPWM) resolution is eight (8) bits, ½⁸ and the output voltage resolution is approximately twelve and one half millivolts (12.5 mV). The frequency information from APC has a six (6) bit resolution (fifty millivolts (50 mV) at worst case) to prevent output voltage level overlapping by ringing to due ripple and noise.

Therefore, the output voltage of the present AVS converter can be regulated by any voltages at ADC resolution between seven tenths of a volt (0.7 V) and one and two tenths volt (1.2 V). The minimum peak ripple is five millivolts (5 mV). The power dissipation from the AVS controller is approximately one hundred microwatts (100 µW) at eight (8) bits DAC resolution.

Figure 16:
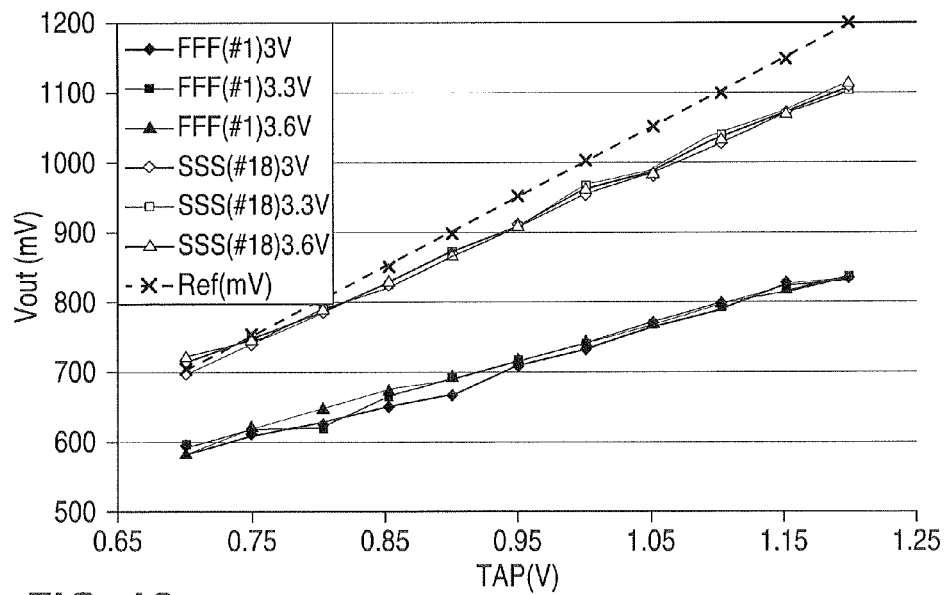
FIG. 16 is a diagram illustrating measured output voltage as a function of tap value in accordance with the principles of the present invention.

FIG. 16 is a diagram illustrating measured output voltages as a function of tap value in accordance with the principles of the present invention. FIG. 16 shows the measured output voltages at different processes corners. FIG. 16 illustrates the equivalent tap voltages to guarantee the same propagation delay at different corners of a thirteen hundredths micron (0.13 µm) process technology. The bottom lines on the graph represent the best cases at room temperature. The middle lines on the graph represent to worst cases at room temperature. The top dashed line in the graph represents an ideal case under the worst condition.

The digital self-adjusting minimum power supply system of the present invention provides a substantially constant minimum supply voltage that guarantees just less propagation delay than critical path delay over changes in process, voltage and temperature (PVT), load, and frequency. The fully digital technique of the present invention provides an improved controller for AVS regulation in digital applications that present a hostile environment for noise-sensitive analog circuits.

The foregoing description has outlined in detail the features and technical advantages of the present invention so that persons who are skilled in the art may understand the advantages of the invention. Persons who are skilled in the art should appreciate that they may readily use the conception and the specific embodiment of the invention that is disclosed as a basis for modifying or designing other structures for carrying out the same purposes of the present invention. Persons who are skilled in the art should also realize that such equivalent constructions do not depart from the spirit and scope of the invention in its broadest form.

Although the present invention has been described with an exemplary embodiment, various changes and modifications may be suggested to one skilled in the art. It is intended that the present invention encompass such changes and modifications as fall within the scope of the appended claims.

What is claimed is:

1. A digital self-adjusting minimum power supply apparatus for use with an adaptable voltage scaled (AVS) power supply node, said apparatus comprising:
   a slack time detector configured to be coupled to said AVS power supply node;
   a voltage adjuster coupled to said slack time detector, said voltage adjuster configured to receive a propagation delay word from the slack time detector and to generate a duty cycle clock signal and a pulse width word that represents a value of supply voltage; and
   a digital pulse width modulation (DPWM) modulator coupled to said voltage adjuster, said DPWM modulator configured to receive the duty cycle clock signal and the pulse width word from said voltage adjuster and to generate a pulse modulated signal;
   wherein said slack time detector, said voltage adjuster, and said DPWM modulator form a closed-loop controller configured to perform discrete time compensation defined by D(n+1)=F(n)+αE(n)+A(n), where D(n+1) denotes a next value of a duty ratio associated with the pulse modulated signal, F(n) denotes a frequency compensation factor, E(n) denotes a detected error, α denotes an error scaling factor implemented using a shift function, and A(n) denotes an accumulated compensation.

2. The apparatus as set forth in claim 1, wherein said voltage adjuster is configured to compensate a supply voltage error at a given frequency from a measurement of said slack time detector and to provide a substantially constant voltage level against variations of frequency, process, voltage, and temperature.

3. The apparatus as set forth in claim 2, wherein said voltage adjuster is configured to receive external input, the external input comprising:
   a fixed frequency clock signal;
   frequency information; and
   reference frequency information.

4. The apparatus as set forth in claim 3, wherein said slack time detector comprises a delayline and a tap register configured to detect propagation delay in response to variations of load, process, and temperature.

5. A digital self-adjusting minimum power supply apparatus for use with an adaptable voltage scaled (AVS) power supply node, said apparatus comprising:
   a slack time detector configured to be coupled to said AVS power supply node;

a voltage adjuster coupled to said slack time detector and configured to receive a propagation delay word from the slack time detector and to generate a duty cycle clock signal and a pulse width word that represents a value of supply voltage; and a digital pulse width modulation (DPWM) modulator coupled to said voltage adjuster and configured to receive the duty cycle clock signal and the pulse width word from said voltage adjuster;

wherein said voltage adjuster is configured to receive external input, the external input comprising a fixed frequency clock signal;

wherein said slack time detector comprises a delayline and a tap register configured to detect propagation delay; and wherein said slack time detector is configured to receive from said voltage adjuster:
- an input clock signal having a frequency that is one fourth of a frequency of said fixed frequency clock signal;
- a sample clock signal that lags by one fourth of a period from said fixed frequency clock signal; and
- a delayline reset signal based on said sample clock signal.

6. The apparatus as set forth in claim 5, wherein said slack time detector is configured to detect a propagation delay of said input clock signal as clocked by said sample clock signal and to output to said voltage adjuster a multi-bit propagation delay word that identifies said propagation delay.

7. The apparatus as set forth in claim 6, wherein said voltage adjuster comprises a control block, the control block comprising a clock generator unit, a tap selector unit, a finite state machine, a control signal generator, and a false low level detector unit.

8. The apparatus as set forth in claim 6, wherein said voltage adjuster comprises a datapath block, the datapath block comprising:
- an error compensator having an input coupled to an output of said slack time detector;
- a frequency compensator coupled to said error compensator; and
- a process, voltage, and temperature (PVT) compensator coupled to said frequency compensator.

9. The apparatus as set forth in claim 8, wherein said error compensator is configured to receive from said slack time detector said propagation delay word and to generate a proportionally compensated delay word that represents a reference value at a default frequency plus a compensated error value.

10. The apparatus as set forth in claim 9, wherein said frequency compensator is configured to receive said proportionally compensated delay word from said error compensator, to use said frequency information and said reference frequency information to adjust a duty cycle of a pulse width modulated (PWM) pulse to a substantially constant supply voltage in response to a given frequency, and to output a frequency compensated word that represents a frequency compensated value.

11. The apparatus as set forth in claim 10, wherein said PVT compensator is configured to receive said frequency compensated word, to compensate for variations due to process, voltage and temperature, and to output the pulse width word that represents a process, voltage, and temperature compensated value.

12. The apparatus as set forth in claim 11, wherein said DPWM modulator is configured to receive said pulse width word from said PVT compensator and to output a pulse modulated signal defined by a value of said pulse width word.

13. A digital self-adjusting minimum power supply apparatus for use with an adaptable voltage scaled (AVS) power supply node, said apparatus comprising:
- a slack time detector configured to be coupled to said AVS power supply node;
- a voltage adjuster coupled to said slack time detector, said voltage adjuster configured to receive a propagation delay word from the slack time detector, wherein said voltage adjuster comprises a control block and a datapath block configured to compensate a supply voltage error at a given frequency from the propagation delay word and to provide a duty cycle clock signal and a pulse width word that represents a substantially constant voltage level against variations of frequency, process, voltage, and temperature; and
- a digital pulse width modulation (DPWM) modulator coupled to said voltage adjuster, said DPWM modulator configured to receive the duty cycle clock signal and the pulse width word from said voltage adjuster and to generate a pulse modulated signal;

wherein said control block of said voltage adjuster comprises a clock generator unit, a tap selector unit, a finite state machine, a control signal generator, and a false low level detector unit;

wherein said tap selector is configured to receive external frequency information and, in response to said frequency information, choose four taps from sixteen taps of said slack time detector; and wherein said control signal generator is configured to output increment or decrement indicators in response to a status of said four taps selected by said tap selector, a status of said finite state machine, and a status of said external frequency information.

14. The apparatus as set forth in claim 13, wherein said clock generator unit is configured to generate from a fixed frequency clock signal:
- an input clock signal having a frequency that is one fourth of a frequency of said fixed frequency clock signal;
- a frequency doubled clock signal having a frequency that is two times that of said fixed frequency clock signal;
- a sample clock signal that lags by one fourth of a period from said fixed frequency clock signal;
- a delayline reset signal based on said sample clock signal; and
- a pulse width modulation (PWM) loading signal having a frequency that is one thirty second of a frequency of the sample clock signal.

15. The apparatus as set forth in claim 13, wherein said finite state machine is configured to control a duty cycle of said DPWM modulator according to a voltage status detected by said four taps that varies over process, voltage, and temperature conditions.

16. A method for providing a digital self-adjusting minimum power supply with regard to process, voltage, temperature, and frequency for use with an adaptable voltage scaled (AVS) power supply node, said method comprising the steps of:
- receiving in a voltage adjuster a propagation delay word from a slack time detector, said slack time detector coupled to said voltage adjuster and to said adaptable voltage scaled (AVS) power supply node;
- compensating in said voltage adjuster a voltage supply error at a given frequency from said propagation delay word to generate a duty cycle clock signal and a pulse width word that represents a substantially constant voltage level against variations of frequency, process, voltage, and temperature;

providing said duty cycle clock signal and said pulse width word to a digital pulse width modulation (DPWM) modulator coupled to said voltage regulator; and generating using the DPWM modulator a pulse modulated signal that represents said substantially constant voltage level based on said pulse width word;

wherein compensating said voltage supply error comprises performing discrete time compensation defined by $D(n+1)=F(n)+\alpha E(n)+A(n)$, where $D(n+1)$ denotes a next value of a duty ratio associated with the pulse modulated signal, $F(n)$ denotes a frequency compensation factor, $E(n)$ denotes a detected error, $\alpha$ denotes an error scaling factor implemented using a shift function, and $A(n)$ denotes an accumulated compensation.

17. The method as set forth in claim 16, wherein compensating said voltage supply error comprises:

generating, from a fixed frequency clock signal, an input clock signal, a sample clock signal, a frequency doubled clock signal, a loading signal, and a delayline reset signal;

detecting a propagation delay of said input clock signal as clocked by said sample clock signal;

generating a multi-bit propagation delay word that identifies said propagation delay;

generating, in response to said multi-bit propagation delay word, a proportionally compensated delay word that represents a reference value at a default frequency plus a compensated error value; and using said proportionally compensated delay word, frequency information, and reference frequency information to generate a frequency compensated word that adjusts a duty cycle of a pulse width modulated (PWM) pulse to a substantially constant supply voltage in response to the given frequency.

18. The method as set forth in claim 17, wherein compensating said voltage supply error further comprises:

using said frequency compensated word to generate a PWM pulse width word that compensates for error due to variations of process, voltage, temperature, and frequency;

loading said pulse width word in response to said loading signal;

changing a binary value of said pulse width word as a count in response to said frequency doubled clock signal;

outputting said binary value of said count as a binary word;

outputting a PWM signal, where a width of said PWM signal is defined by said value of said binary word; and generating a direct current (DC) supply voltage on said AVS power node in response to said PWM signal.

* * * * *